United States Patent
Gruenewald et al.

(10) Patent No.: US 6,817,281 B2
(45) Date of Patent: Nov. 16, 2004

(54) DISPOSABLE FLUID INFUSION NOZZLE ARRANGEMENT

(76) Inventors: Frederick P. Gruenewald, 128 Lafayette St., Marblehead, MA (US) 01945; Thomas Muldoon, 128 Lafayette St., Marblehead, MA (US) 01945

(*) Notice: Subject to any disclaimer, the term of this patent is extended or adjusted under 35 U.S.C. 154(b) by 0 days.

(21) Appl. No.: 10/202,104

(22) Filed: Jul. 24, 2002

(65) Prior Publication Data

US 2004/0016347 A1 Jan. 29, 2004

(51) Int. Cl.[7] .............................. A23F 3/00; B01F 3/04
(52) U.S. Cl. ................... 99/323.1; 99/275; 261/DIG. 7; 261/DIG. 16
(58) Field of Search ........................... 99/323.2, 323.1, 99/275; 261/DIG. 7, DIG. 16

(56) References Cited

U.S. PATENT DOCUMENTS

| | | | | |
|---|---|---|---|---|
| 2,919,726 A | * | 1/1960 | Zimmermann et al. | 141/69 |
| 4,620,953 A | * | 11/1986 | Silla et al. | 261/142 |
| 6,036,054 A | * | 3/2000 | Grill | 222/3 |
| 6,401,598 B1 | * | 6/2002 | Tavlarides | 99/323.2 |

\* cited by examiner

Primary Examiner—Reginald L. Alexander
(74) Attorney, Agent, or Firm—Don Halgren

(57) ABSTRACT

An arrangement for infusing a consumable infusable product into a customer-use container enclosing a first consumable product. The arrangement comprises a static whipping device having an internal chamber containing a pressurized gas and an amount of the first consumable product. An elongated discharge conduit is arranged in fluid communication with the internal chamber of the whipping device. The discharge conduit has a distal end with a control valve thereon. The control valve has an adaptor member to slidably receive a single-product discharge tubular member for discharge of an infusable edible product into the first consumable product. A single-product tubular member is slidably engaged onto the adaptor member for use as a straw by a consumer after the tubular member has discharged the infusable edible product into the first consumable product.

13 Claims, 1 Drawing Sheet

DISPOSABLE FLUID INFUSION NOZZLE ARRANGEMENT

BACKGROUND OF THE INVENTION

1. Field of the Invention

The present invention relates to infusion arrangements for consumable liquids and more particularly to disposable infusion nozzle arrangements for multiple use in consumers' edible liquids.

2. Prior Art

This patent application incorporates by reference U.S. Pat. No. 4,993,599 to Gruenewald entitled "Static Pressure Whipping Dispenser Equipped Products and Process of Operation".

The introduction of aerated whipped fluids from a pressurized whipping or emulsifying food product container have been used and known for some time. Such whipped, aerated or emulsified food products such as whipped cream have been utilized in households and in commercial establishments such as restaurants and bars. Such whipped cream has typically introduced onto a top layer of a liquid to be consumed, by a static pressure whipped cream dispenser such as that shown for example, by the U.S. Pat. No. 4,993,599. Other supply containers such as disposable aerosol cans or disposable cartridge dispensers have been utilized to apply such whippable fluids to drinks, pies, cakes and ice cream sundaes and the like at ice cream parlors, restaurants, hotels and commercial bakeries for decades. Such use is accomplished by agitating the aerosol dispenser can, and then holding it upside down and pointing its nozzle onto the top of the food/liquid being supplied with the whipped cream.

The introduction of such whipped fluids into any location within the primary food product has heretofore not occurred, or would have been accomplished by an elongated "re-usable" (expensive/required-cleanable) nozzle introduced into the a central or other internal portion of the edible commodity being infused.

Such a metal "re-usable" nozzle arrangement unfortunately has to be removed from the dispenser and cleaned and reinstalled onto the whipped cream dispenser. This is inconvenient and time consuming for such a routine in places such as fast-food type restaurants, regular restaurants, and bars, where it is desired to introduce a different flavor whipped product or permit the utilization of a different taste or mix of an infusible product into a subsequent customer's purchase. This is not only time consuming, but it is wasteful and very likely an unsanitary activity by entry level employees at such restaurants, fast food establishments and bars.

There is a need then for the utilization of a dispenser nozzle of aerated whippable fluids into a succession of consumable, edible products whereby customer individuality is maintained, sanitation is ensured, and efficiency of the dispensing of such whippable or emulsified food products is maximized.

It is thus an object of the present invention to overcome the disadvantages of the prior art.

It is a further object of the present invention to provide an infusion nozzle arrangement which is adapted to individual customer uses, is accepted by the National Sanitation Foundation and which dispensing nozzle provides for more than one use or function during its "customer-use" lifetime.

A still further object of the present invention is to provide a unique nozzle arrangement for static whipped cream portable dispensers of the type where shaking is un-necessary and the cleaning of dispenser nozzles after each use is also eliminated.

BRIEF SUMMARY OF THE INVENTION

The present invention provides a method and apparatus for the dispensing of whippable food products from a static, pressurized "whip" dispenser device of whipped products. The static whipping device comprises a container having an interior chamber adapted to confine a propellant gas and a given amount of whippable fluid under a propellant gas pressure therein. The contents of the container may be discharged by through an upper cap element which is secured to the container and which closes the chamber. A pressure meter is arranged on the cap element to identify the amount propellant gas remaining within the internal chamber of the container. An internal receiving conduit is in fluid communication with the whippable liquid within the container. The internal receiving conduit has an upper end which is in fluid communication with the cap element. An articulable rigid, or an elongated flexible fluid discharge conduit is in fluid communication with the cap element. The discharge conduit has a manually actuated control valve on its distalmost end. The control valve on the distal end of the elongated fluid discharge conduit permits the whippable product to be propelled through the internal receiving conduit, the cap element, and the rigid or flexible discharge conduit and out of a nozzle on the discharge end of the control valve.

The discharge nozzle comprises a tapered truncated member which is adapted to receive a disposable elongated tubular element such as a straw or the like. Such a straw is typically between eight to twelve inches long and approximately three sixteenths to three eighths of an inch in diameter. Such a truncated discharge portion is tapered so as to permit the serial receipt a variety of diameter straws depending upon the nature of the food service operation and the nature of the infused product, for example, whipped cream, ice cream, flavorings, carbonated gases or the like) or consumable product into which the infused product is discharged.

In a preferred embodiment of the present invention, a customer usable container such as a cup or a glass is filled with a consumable product such as a drink or a semi solid such as a smoothie, frozen drink, sundae or ice cream. A disposable elongated tubular member or straw (typically plastic) is slid onto the opened tapered end of the discharge nozzle. The device operator inserts the distalmost end of the elongated tube or straw into an inner or a central portion of the consumable product within the cup or glass or edible food container and opens the control valve so as to discharge a propellant and whippable product therefrom and into that inner or central portion of the consumable product within that cup, glass or consumable drinl. The tube or straw may be withdrawn from the consumable within the cup or glass so as to discharge a further infused product upon the upper surface of that consumable product, or the tubular member may be immediately removed from the open tapered discharge end of the discharge nozzle. Thus internal whipped emulsified and aerated product may be made and discharged within any inner or central portion or upper portion of a consumable product for an individual customer. The tubular element which is removed from the truncated portion of the discharge nozzle and is then left within the customer's individual container. That tubular element thus also acts as the customer's straw by which the customer may consume the consumable product or liquid within his/her own personal container.

The operator of the discharge device may then place a new elongated tube or straw on the truncated end of the discharge nozzle adjacently control valve to serve the next customer. Cleaning of the individual tubular dispensers which may have to be inserted into the next consumable product for the next customer is thus avoided and the sanitation of that product in dispensing operation is thus maintained.

In a further preferred embodiment of the present invention, the elongated tubular element may have a generally curvilinear surface extending from one side edge of its distalmost end. Such curvilinear surface may function as a spoon and the straw functioning as a handle of that spoon to both serve as the infuser of the product within the consumable product and a personal eating utensil for the customer. By use of an infused product within the consumable liquid or semi solid within the cup or glass, less consumable product need be supplied to the glass or cup because of the displacement of the whipped cream or emulsified product therewithin requires less original consumable liquid originally poured into that customer's container.

In a yet further preferred embodiment of the present invention, such a elongated tubular element may be utilized to carbonate drinks by infusing a chilled gas, chilled air or chilled fluid into the liquid within the cup or container of the customer.

Thus what has been shown is a disposable infusion arrangement or utilization with a whipped cream dispenser or the like which may be utilized by business establishments to serve individual customers faster, to their own individual requirements while saving on time, eliminating unsanitary conditions and providing a utensil for that consumer as well.

The invention thus comprises an arrangement for infusing a consumable infusable product into a customer-use container enclosing a first consumable product, comprising: a static whipping device having an internal chamber containing a pressurized gas and an amount of the first consumable product; an elongated discharge conduit in fluid communication with the internal chamber of the whipping device, the discharge conduit having a distal end with a control valve thereon, the control valve having an adaptor member to slidably receive a single-product discharge tubular member for discharge of an infusable edible product into the first consumable product; and a single-product tubular member slidable engaged onto the adaptor member for use as a straw by a consumer after the tubular member has discharged the infusable edible product into the first consumable product. The adaptor member may be a tapered, hollow channel member for providing snug, sliding receipt of the tubular member and passage of the infusable product therethrough. The single product tubular member may have a distal end with a curvilinear surface arranged on one side edge thereof to function as a spoon for the consumer of the first consumable product and the infused product. The tubular member preferably has a diameter of between three sixteenths and three eights of an inch. The infusable product may comprise a whippable cream and a pressurized gas expelled from the internal chamber.

The invention may also comprises a method for infusing a consumable infusable product into a customer-use container enclosing a first consumable product comprising: providing a static whipping device having an internal chamber containing a pressurized gas and an amount of the first consumable product; attaching an elongated discharge conduit to the internal chamber of the whipping device, the discharge conduit having a distal end with a control valve thereon, the control valve having an adaptor member arranged to slidably receive a single-product tubular-discharge member for discharge of an infusable edible product into the first consumable product; and sliding a single-product tubular member into snug engagement with the adaptor member for use as a straw by a consumer, after the tubular member has discharged the infusable edible product into the first consumable product. The method may include removing the tubular member from the adaptor to permit a consumer to use the tubular member as a straw after the tubular member has infused the infusable product into the container.

The invention may also comprise a method of infusing a central inner portion of a first consumable product in a consumer's container with an edible whipped product, comprising the steps of: providing a static whipping device with a pressurized gas and a quantity of the first consumable product in an internal chamber of the device; arranging a conduit with a valve on a distal end thereof into fluid communication with the internal chamber; attaching a single serving tubular member onto the valve; inserting the tubular member into a central portion of the first consumable product in the consumer's container; discharging a portion of the edible whipped product into the first consumable product in the consumer's container; and removing the tubular member from the valve to permit the consumer to use the tubular member as a straw.

BRIEF DESCRIPTION OF THE DRAWINGS

The objects and advantages of the present invention will become more apparent, when view in conjunction with the following drawings in which.

DETAILED DESCRIPTION OF THE PREFERRED EMBODIMENTS

Figure 1:
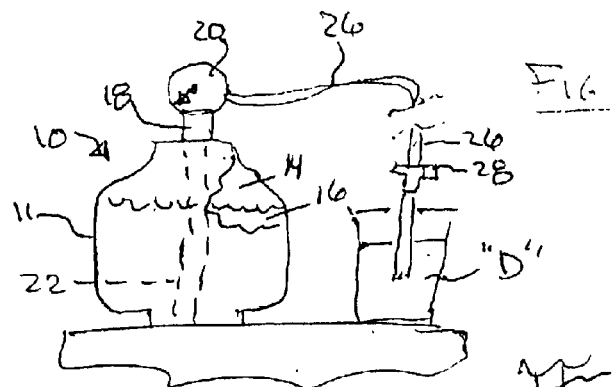
FIG. 1 is a side elevational view of a pressurizable, whippable liquid container and dispersal apparatus constructed according to the principles of the present invention.

Referring now to the drawings in detail, and particularly to FIG. 1 there is shown the present invention which comprises an apparatus for the dispensing of whippable food products from a static (generally stationary, business sized), pressurized "whip" dispenser device 10 of whipped products. The static whipping device 10 comprises a container 11 having an interior chamber 12 adapted to confine a propellant gas 14 and a given amount of whippable fluid 16 under the pressure of the propellant gas 14 therein. The whippable fluid contents 16 of the container 10 may be discharged by through an upper cap element 18 which is secured to the container 10 and which closes the chamber 12. A pressure meter 20 is arranged on the cap element 18 to identify the amount propellant gas 14 remaining within the internal chamber 12. An internal receiving conduit 22, as more properly identified in my earlier aforementioned U.S. Pat. No. 4,993,599, and incorporated herein by reference, is in fluid communication with the whippable liquid 16 within the container 11. The internal receiving conduit 22 has an upper end 24 which is in fluid communication with the cap element 18. An articulable rigid, or an elongated flexible fluid discharge conduit 26 is in fluid communication with the cap element 18. The discharge conduit 26 has a manually actuated control valve 28 on its distalmost end, as may be seen in FIGS. 1 and 2. The control valve 28 on the distal end of the elongated fluid discharge conduit 26 permits whippable infusable product "P" to be propelled through the internal receiving conduit 22, the cap element 18, and the rigid or flexible discharge conduit 26 and out a nozzle 30 on the discharge end of the control valve 28.

The discharge nozzle 30 comprises a short taper (for example, anywhere from about two sixteenths to about one half of an inch, in any case, tapered to snugly, receivingly engage a resilient, common plastic straw thereon), hollow, truncated adaptor channel member 32 which is adapted to slidably and snugly receive a disposable elongated tubular element 34 such as a straw or the like. A knurled ring 31 may be arranged on the proximal edge of the nozzle 30 to provide the attendant a gripping means thereon, when removing the straw 34 therefrom. Such a straw 34 is typically between eight to twelve inches long and approximately three sixteenths to three eighths of an inch in diameter. Such a truncated discharge portion 32 is tapered as stated hereinabove, so as to permit the snug, serial receipt a variety of diameter straws depending upon the nature of the food service operation and the nature of the infusable product "P", for example, whipped cream, ice cream, flavorings, carbonated gases or the like) or consumable product into which the infused product is discharged.

Figure 2:
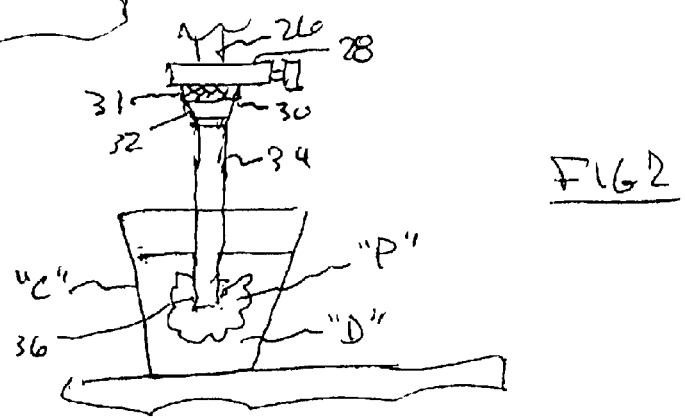
FIG. 2 is a side elevational view partly in section, of a consumer container and discharge arrangement of the present invention.
Figure 3:
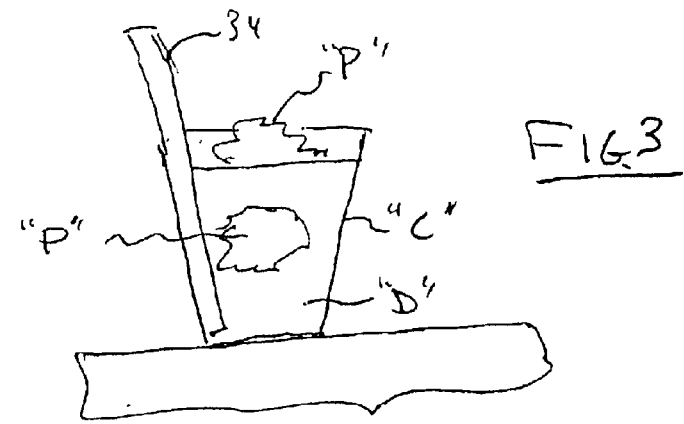
FIG. 3 is a side elevational view, partly in section of a consumer's container and edible product show a in conjunction with the infusion apparatus of the present invention.

In a method of use of a preferred embodiment of the present invention, a customer usable container "C" such as a cup or a glass is filled with a consumable product "D" such as a drink or a semi-solid such as a sundae or ice cream. A disposable elongated tubular member or straw 34 (typically plastic) is slid onto the opened tapered end 32 of the discharge nozzle 30. The device operator inserts the distalmost end 36 of the elongated tube 34 or straw into the central portion of the consumable product within the cup or glass or edible food container and opens the control valve 28 so as to discharge a propellant and whippable product "P" therefrom and into that central portion of the consumable product within that cup or glass "C", as shown in FIG. 2. The tube or straw 34 may be withdrawn from the consumable within the cup or glass so as to discharge a further infused product "P" upon the upper surface of that consumable product, or the tubular member 34 may be immediately removed from the open tapered discharge end 32 of the discharge nozzle 30. Thus an internal whipped emulsified and aerated product may be made and discharged within an inner (below the surface) or central portion and also an upper portion (if desired) of a consumable product "D" for an individual customer. The tubular element which is removed from the truncated portion 32 of the discharge nozzle 30 and is then left within the customer's individual container "C" as shown on FIG. 3. That tubular element 34 thus not only acts as an infusion conduit for discharge of whipped cream, or in further preferred embodiments, a chilled gas, flavoring or liquid within an inner, non-surface, or central portion of a drink "D", but it also acts as the customer's straw by which the customer may consume the consumable product or liquid "D" and "P" within his/her own personal container "C".

The operator of the discharge device 10 may then place a new elongated tube or straw 34 on the truncated end 34 of the discharge nozzle 32 adjacently control valve 28 to serve the next customer. Cleaning of the individual tubular dispensers (prior art requirement) which may have to be inserted into the next consumable product for the next customer is thus avoided and the sanitation of that product in dispensing operation is thus maintained.

Figure 4:
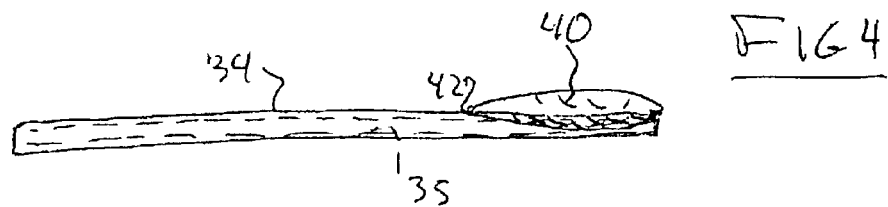
FIG. 4 is a side elevational view of a further embodiment of the elongated infusion tube of the present invention.

In a further preferred embodiment of the present invention, as shown in FIG. 4, the elongated tubular element 34 may have a generally curvilinear surface 40 extending from one side edge 42 of its distalmost end 36. A lumen 35 extends to the distalmost tip of the curvilinear surface 40, as shown in FIG. 4. Such curvilinear surface 40 may function as a spoon and the straw 34 functioning as a handle of that spoon 40 to both serve as the infuser of the product "P" within the consumable product "D" and a personal eating utensil for the customer. By use of an infused product within the consumable liquid or semi solid within the cup or glass, less consumable product need be supplied to the glass or cup because of the displacement of the whipped cream or emulsified product therewithin requires less original consumable liquid originally poured into that customer's container.

In a yet further preferred embodiment of the present invention, such a elongated tubular element 34 may be utilized to carbonate drinks by infusing a chilled air or chilled fluid into the liquid within the cup or container "C" of the customer.

Thus what has been shown is a disposable infusion arrangement or utilization with a static whipped cream dispenser or the like which may be utilized to faster serve individual customers to their own individual requirements while saving on time, eliminating unsanitary conditions and providing a utensil for that consumer as well.

We claim:

1. An arrangement for infusing a consumable infusable product into a customer-use container enclosing a first consumable product, comprising:

a whipping device apparatus having an internal chamber containing a pressurized gas and an amount of said first consumable product;

an elongated discharge conduit in fluid communication with said internal chamber of said whipping device, said discharge conduit having a distal end with a control valve thereon, said control valve having an adaptor member to slidably receive a single-product discharge tubular member for discharge of an infusable edible product into said first consumable product wherein said adaptor member is a tapered, hollow channel member for providing snug, sliding receipt of said tubular member and passage of said infusable product therethrough; and a single-product tubular member slidable engaged onto said adaptor member for use as a straw by a consumer, after said tubular member has discharged said infusable edible product into said first consumable product said single product tubular member having a distal end with a curvilinear surface arranged on one side edge thereof to function as a spoon for the consumer of said first consumable product and said infused product.

2. The arrangement for infusing a consumable infusable product into a customer-use container enclosing a first consumable product as recited in claim 1, wherein said tubular member has a diameter of between three sixteenths and three eights of an inch.

3. The arrangement for infusing a consumable infusable product into a customer-use container enclosing a first consumable product as recited in claim 1, wherein said infusable product comprises a whippable cream and a pressurized gas expelled from said internal chamber.

4. The arrangement for infusing a consumable infusable product as recited in claim 1, wherein said tubular member has a lumen which extends to a distal end of said spoon thereon.

5. The arrangement for infusing a consumable infusable product as recited in claim 1, wherein said adaptor member has a knurled ring thereon to facilitate manual gripping thereof.

6. The arrangement for infusing a consumable infusable product as recited in claim 1, wherein said whipping device apparatus is static.

7. A method for infusing a consumable infusable product into a customer-use container enclosing a first consumable product comprising:

providing a static whipping device having an internal chamber containing a pressurized gas and an amount of said first consumable product;

attaching an elongated discharge conduit to said internal chamber of said whipping device, said discharge conduit having a distal end with a control valve thereon, said control valve having an adaptor member arranged to slidably receive a single-product tubular-discharge member for discharge of an infusable edible product into said first consumable product, said adaptor member comprising a tapered, hollow channel member for providing snug, sliding receipt of said tubular member and passage of said infusable product therethrough; and sliding a single-product tubular member into snug engagement with said adaptor member for use as a straw by a consumer, after said tubular member has discharged said infusable edible product into said first consumable product, said single product tubular member having a distal end with a curvilinear surface arranged on one side edge thereof to function as a spoon for the consumer of said first consumable product and said infused product.

8. The method as recited in claim 7, including:

removing said tubular member from said adaptor to permit a consumer to use said tubular member as a straw after said tubular member has infused said infusable product into said container.

9. A method of infusing an inner portion of a first consumable product in a consumer's container with an edible whipped product, comprising the steps of:

providing a static whipping device with a pressurized gas and a quantity of said first consumable product in an internal chamber of said device;

arranging a conduit with a valve on a distal end thereof into fluid communication with said internal chamber;

attaching a single product serving disposable, tubular member onto said valve, said single product tubular member having a distal end with a curvilinear surface arranged on one side edge thereof to function as a spoon for the consumer of said first consumable product and said infused product;

inserting said tubular member into a central portion of said first consumable product in said consumer's container;

discharging a portion of said edible whipped product into said first consumable product in said consumer's container; and removing said tubular member from said valve to also permit said consumer to use said tubular member as a straw.

10. The method of infusing an inner portion of a first consumable product in a consumer's container as recited in claim 9, wherein said tubular member has a spoon on one end thereof.

11. The method of infusing an inner portion of a first consumable product in a consumer's container as recited in claim 10, wherein said tubular member extends along said spoon, to a distalmost end thereof.

12. The method of infusing an inner portion of a first consumable product in a consumer's container as recited in claim 10, wherein said tubular member is made of resilient plastic to permit slight expansion onto said valve.

13. The method of infusing an inner portion of a first consumable product in a consumer's container as recited in claim 12, wherein said valve comprises a hollow, tapered, knurled adaptor arranged to removably receive said straw thereon.

* * * * *